United States Patent
Ichida et al.

(10) Patent No.: US 7,651,423 B2
(45) Date of Patent: Jan. 26, 2010

(54) VARIABLE SPEED DRIVE DEVICE FOR BICYCLE

(75) Inventors: Tadashi Ichida, Ikoma (JP); Kazuhiro Fujii, Kawachinagano (JP)

(73) Assignee: Shimano Inc., Osaka (JP)

(*) Notice: Subject to any disclaimer, the term of this patent is extended or adjusted under 35 U.S.C. 154(b) by 794 days.

(21) Appl. No.: 11/092,613

(22) Filed: Mar. 30, 2005

(65) Prior Publication Data

US 2005/0277503 A1    Dec. 15, 2005

(30) Foreign Application Priority Data

Jun. 15, 2004    (JP)    ............... 2004-177331

(51) Int. Cl.
*F16H 9/00*    (2006.01)
*G05G 1/04*    (2006.01)

(52) U.S. Cl. .................. 474/80; 474/81; 474/82; 74/516; 74/519; 74/579; 74/42; 188/15

(58) Field of Classification Search .................. 474/80, 474/81, 82; 74/519, 516, 579, 42; 188/15
See application file for complete search history.

(56) References Cited

U.S. PATENT DOCUMENTS

| | | | |
|---|---|---|---|
| 4,065,983 A | | 1/1978 | Mimura et al. |
| 4,391,159 A | * | 7/1983 | Sellmeyer .................. 74/516 |
| 4,520,907 A | * | 6/1985 | Sikora .................. 188/156 |
| 4,817,463 A | * | 4/1989 | Cameron .................. 475/154 |
| 4,952,196 A | * | 8/1990 | Chilcote et al. .................. 474/70 |
| 5,004,077 A | * | 4/1991 | Carlson et al. .................. 188/2 D |
| 5,653,649 A | | 8/1997 | Watarai et al. |
| 5,832,784 A | * | 11/1998 | McCallips et al. .................. 74/512 |
| 5,873,283 A | | 2/1999 | Chen et al. |
| 6,293,882 B1 | | 9/2001 | Kitamura et al. |
| 2003/0027674 A1 | | 2/2003 | Valle |
| 2003/0092519 A1 | | 5/2003 | Fukuda |

FOREIGN PATENT DOCUMENTS

| | | |
|---|---|---|
| DE | 4022473 A1 | 1/1992 |
| EP | 1010613 A | 6/2000 |
| EP | 1281611 A | 2/2003 |
| JP | 3423285 B2 | 7/2001 |

\* cited by examiner

*Primary Examiner*—Bradley T King
*Assistant Examiner*—Mahbubur Rashid
(74) *Attorney, Agent, or Firm*—Global IP Counselors, LLP

(57) ABSTRACT

A front variable speed drive device is configured and arranged to electrically operate driving of a front derailleur by a shift cable. The front variable speed drive device comprises a case member, a motor drive mechanism, and a cable linking portion. The case member is mounted on a hanger portion of a bicycle frame. The motor drive mechanism is mounted on the case member, and has a revolving shaft. The cable linking portion has a retaining portion configured and arranged to retain a first end of the shift cable. The cable linking portion is rotatably mounted on the revolving shaft, and has a hypothetical arm line extending in the direction perpendicular to the shift cable from the center of rotation with a length of the hypothetical arm line changing depending on the rotation phase. Thus, motor torque required for shifting gears is reduced with a simple structure.

7 Claims, 12 Drawing Sheets

VARIABLE SPEED DRIVE DEVICE FOR BICYCLE

CROSS-REFERENCE TO RELATED APPLICATIONS

This application claims priority to Japanese Patent Application No. 2004-177331. The entire disclosure of Japanese Patent Application No. 2004-177331 is hereby incorporated herein by reference.

BACKGROUND OF THE INVENTION

1. Field of the Invention

The present invention relates to a variable speed drive device for a bicycle. More specifically, the present invention relates to a variable speed drive device for a bicycle adapted to be coupled to a variable speed gearshift device via a transmission member to electrically drive the variable speed gearshift device.

2. Background Information

Japanese Patent No. 3423285 discloses a conventional variable speed drive device used in a bicycle that is configured and arranged to electrically operate driving of a bicycle derailleur, an internal shift hub, or other variable speed gearshift via a shift cable or other transmission member. This conventional variable speed drive device has a case member, a motor installed on the case member, a reduction gear mechanism for slowing rotation of the motor, a cam mechanism linked to the reduction gear mechanism, a rocker link that is rocked by the cam mechanism, and an inner fastener mounted on the rocker link. The rocker link has an arcuate cable winding surface adjacent to the inner fastener to which an inner cable is coupled. The conventional variable speed drive device is also provided with a coil spring member for biasing the inner cable in the tensioning direction.

With such conventional variable speed drive device disclosed in the above mentioned reference, when the motor operates in response to a shift command, the cam mechanism rotates via the reduction gear mechanism. The rotation of the cam mechanism causes the rocker link to rock, letting out or pulling in the inner cable to execute shift operations of a variable speed gearshift device coupled to the inner cable. By imparting biasing force of the coil spring member to the rocker link, even when the level of force of a return spring of the variable speed gearshift device increases, this force will be cancelled out by the biasing force of the coil spring member, thereby minimizing the torque required of the motor in the gearshift operation.

In view of the above, it will be apparent to those skilled in the art from this disclosure that there exists a need for an improved variable speed drive device for a bicycle. This invention addresses this need in the art as well as other needs, which will become apparent to those skilled in the art from this disclosure.

SUMMARY OF THE INVENTION

With the conventional variable speed drive device described above, by providing the coil spring member and the link mechanism, the rocker link is biased in the cable winding direction by the coil spring member during coil windup. Thus, the level of torque of the motor required to perform the gearshift operation is reduced, and thus, the size of the motor can be made smaller. However, since mechanisms such as the cam mechanism and the biasing mechanism with the coil spring member are needed in the conventional variable speed drive device disclosed in the above mentioned reference, the overall structure of the variable speed drive device become complicated.

Therefore, one object of the present invention is to provide a variable speed drive device that is configured and arranged to reduce the level of motor torque required for gear shifting with a simple structure.

The foregoing objects can basically be attained by providing a variable speed drive device that is adapted to be coupled to a variable speed gearshift device of a bicycle via a transmission member to electrically drive the variable speed gearshift device. The variable speed drive device comprises a case member, a motor drive mechanism and a linking structure. The case member is configured and arranged to be mounted to a frame of the bicycle. The motor drive mechanism is mounted on the case member, the motor drive mechanism having a revolving shaft. The linking structure has a retaining portion configured and arranged to retain the transmission member. The linking structure is mounted on the revolving shaft of the motor drive mechanism, and configured and arranged such that a length of a hypothetical arm line measured extending from a center of rotation of the revolving shaft perpendicularly to a longitudinal axis of the transmission member changes depending on a rotational phase of the revolving shaft when the transmission member is attached to the retaining portion.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
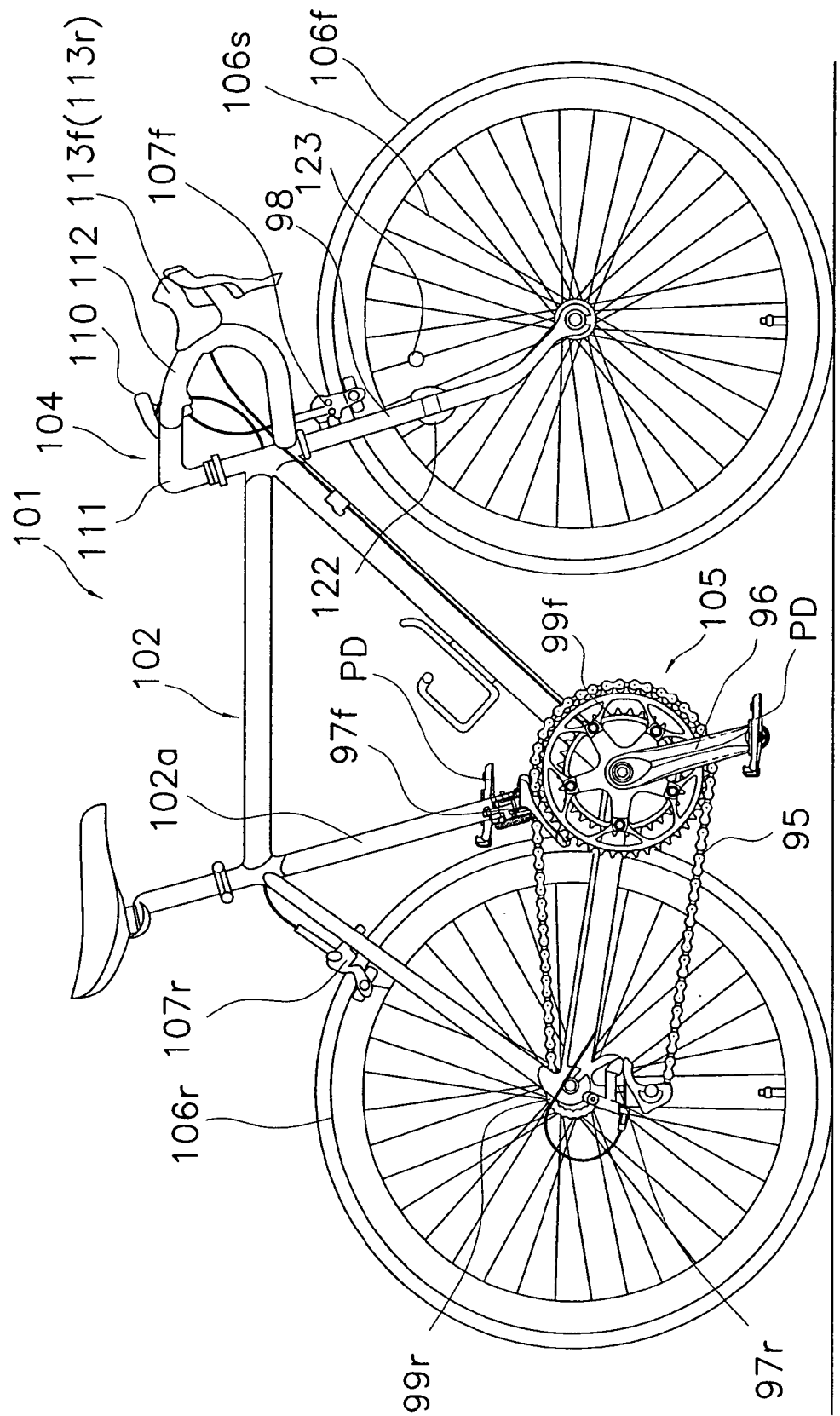
FIG. 1 is a side elevational view of a bicycle provided with a variable speed drive device in accordance with a first embodiment of the present invention.

Referring initially to FIG. 1, a bicycle 101 is illustrated in accordance with a first embodiment of the present invention. As seen in FIG. 1, the bicycle 101 is a road racer that basically comprises a diamond shaped frame 102, a handlebar portion 104, a drive portion 105, a pair of front and rear wheels 106$f$ and 106$r$, a pair of front and rear brake devices 107$f$ and 107$r$ and a variable speed gearshift device 110. The diamond shaped frame 102 has a front fork 98 to which the handlebar portion 104 is fastened. The drive portion 105 comprises a chain 95, a crank 96 with a pair of pedals PD, a pair of front and rear derailleurs 97$f$ and 97$r$, a pair of front and rear sprocket sets 99$f$ and 99$r$, and other conventional components. The front and rear wheels 106$f$ and 106$r$ are installed on the front fork 98 and the rear side of the frame 102, respectively, as seen in FIG. 1. The variable speed gearshift device 110 is configured and arranged to control gear shift operations of the front and rear derailleurs 97$f$ and 97$r$.

Figure 2:
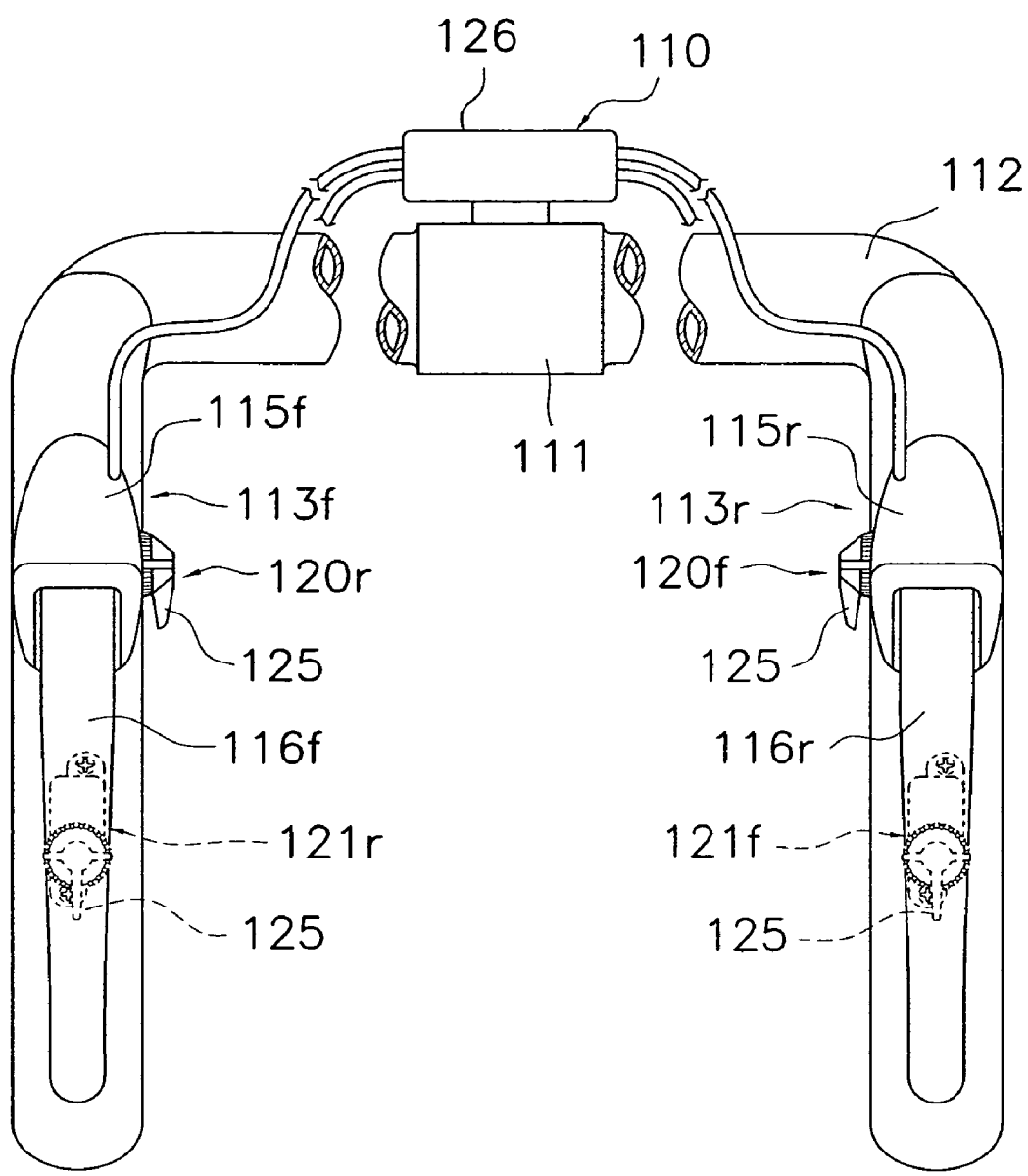
FIG. 2 is an enlarged partial front elevational view of a handlebar portion of the bicycle illustrated in FIG. 1 in accordance with the first embodiment of the present invention.
Figure 3:
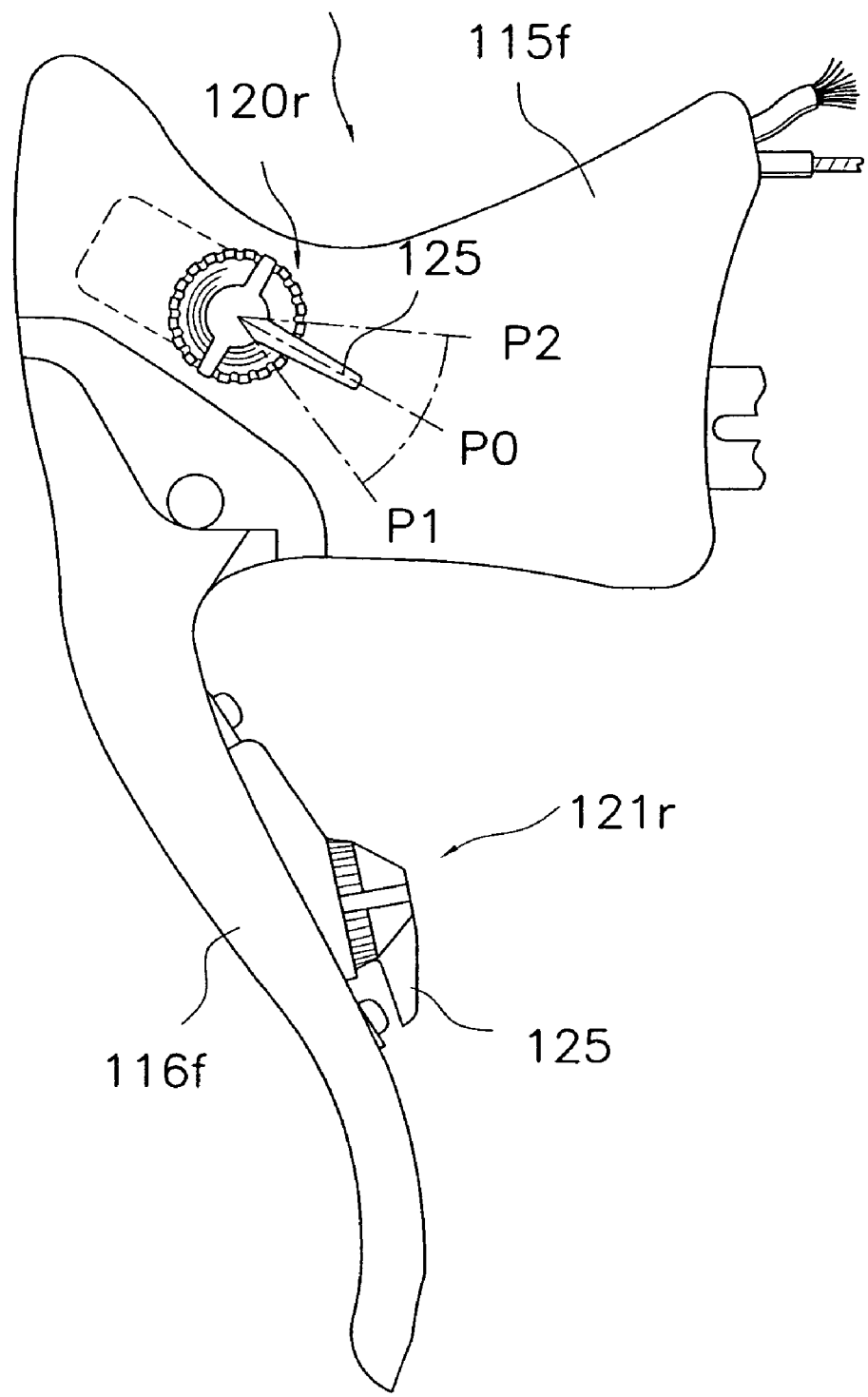
FIG. 3 is an enlarged side elevational view of a rear brake lever of the bicycle illustrated in FIG. 1 in accordance with the first embodiment of the present invention.
Figure 4:
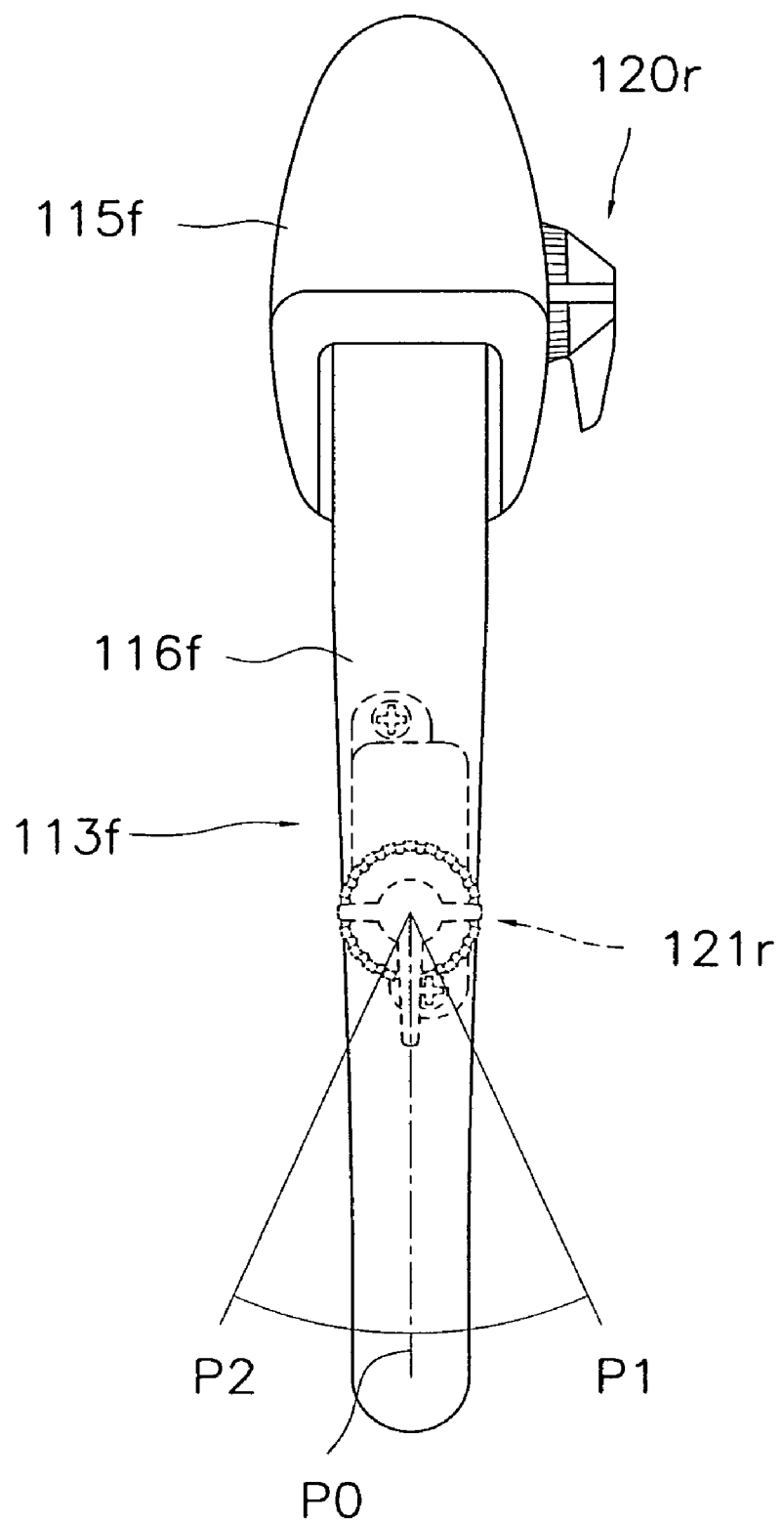
FIG. 4 is an enlarged front elevational view of the rear brake lever illustrated in FIG. 3 in accordance with the first embodiment of the present invention.

As seen in FIG. 2, the handlebar portion 104 comprises a handlebar stem 111, and a handlebar 112 fixedly coupled to the upper end of the handlebar stem 111. The handlebar stem 111 is fixedly coupled to an upper end of the front fork 98. The handlebar 112 is a drop handle type handlebar equipped with left and right brake levers 113$f$ and 113$r$. As shown in FIGS. 2 to 4, the brake levers 113$f$ and 113$r$ have front and rear brake brackets 115$f$ and 115$r$, respectively, mounted on the handlebar 112, and front and rear brake lever members 116$f$ and 116$r$ are swivelably installed in the brake brackets 115$f$ and 115$r$, respectively.

As seen in FIGS. 2 to 4, the brake brackets 115$f$ and 115$r$ are provided with a pair of front and rear shifter portions 120$f$ and 120$r$, respectively, on the inner surfaces thereof. The brake lever members 116$f$ and 116$r$ are provided with a pair of front and rear shifter portions 121$f$ and 121$r$, respectively, on the back surfaces thereof. The front shifter portion 120$f$ of the brake bracket 115$f$, and the front shifter portion 121$f$ of the brake lever member 116$f$ are configured and arranged to shift the front derailleur 97$f$. Likewise, the rear shifter portion 120$r$ of the brake bracket 115$r$, and the rear shifter portion 121$r$ of the brake lever member 116$r$ are configured and arranged to shift the rear derailleur 97$r$. The front shifter portion 120$f$ and the rear shifter portion 120$r$ are provided separately on the brake brackets 115$f$ and 115$r$, respectively, so that the shifting operation can be performed while hands of a rider are resting on the front brake bracket 115$f$ and the rear brake bracket 115$r$. The front shifter portion 121$f$ and the rear shifter portion 121$r$ are provided separately on the front and rear lever members 116$f$ and 116$r$, respectively, so that the shifting operations can be performed with the hands resting on the front brake lever member 116$f$ and the rear brake lever member 116$r$.

Each of the shifter portions 120$f$, 120$r$, 121$f$ and 121$r$ has a shift control member 125 that can toggle between a neutral shift position P0, a first position P1 that is positioned downwardly (the shifter portions 120$f$ and 120$r$) or inwardly (the shifter portions 121$f$ and 121$r$) from the neutral shift position P0, and a second position P2 positioned upwardly (the shifter portions 120$f$ and 120$r$) or outwardly (the shifter portions 121$f$ and 121$r$) from the neutral shift position P0. The shift control member 125 is biased towards the neutral shift position P0. Each of the shifter portions 120$f$ and 121$f$ has a front upshift switch 131$f$ and a front downshift switch 132$f$ (shown in FIG. 6) disposed therein. Similarly, each of the shifter portions 120$r$ and 121$r$ has a rear upshift switch 131$r$ and a rear downshift switch 132$r$ (shown in FIG. 6) disposed therein. In the first embodiment of the present invention, when one of the shift control members 125 is operated to the first position P1, the respective one of the front and rear upshift switches 131$f$ and 131$r$ is turned ON, whereas when one of the shift control member 125 is operated to the second position P2, the respective one of the front and rear downshift switches 132$f$ and 132$r$ turn ON. This combination is established appropriately.

Figure 6:
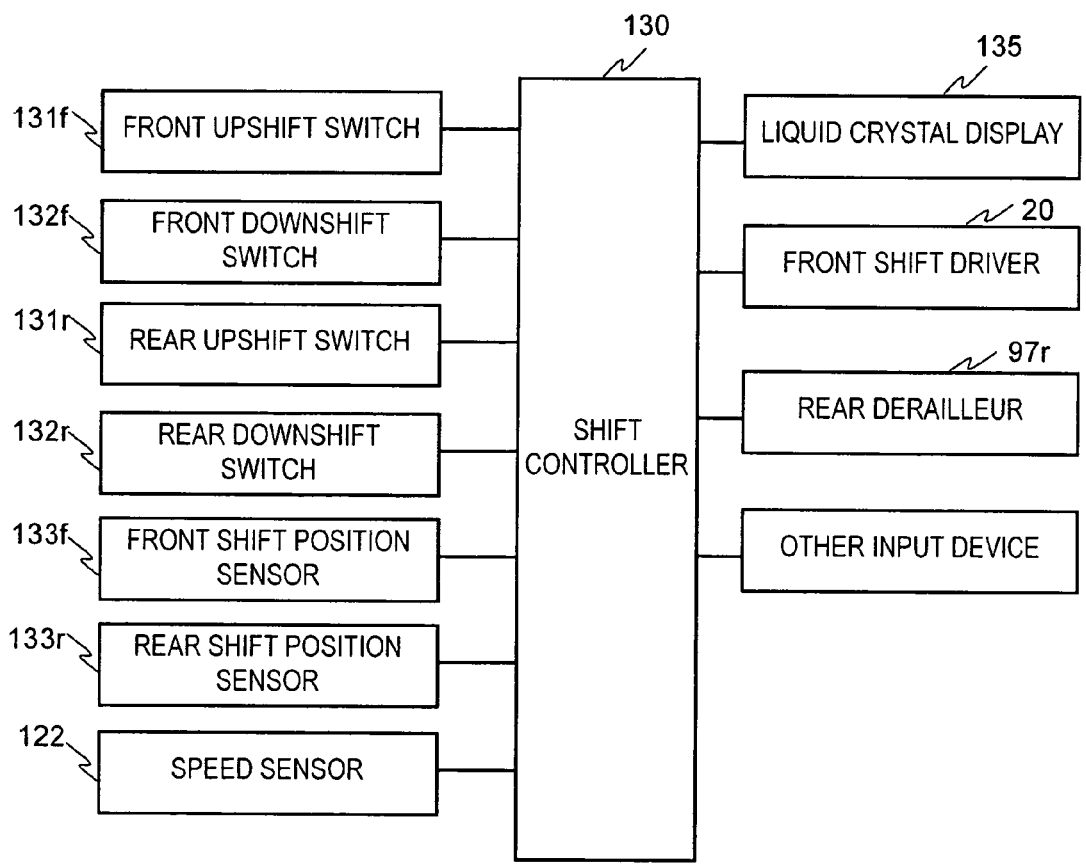
FIG. 6 is a block diagram illustrating a shift control device in accordance with the first embodiment of the present invention.

As shown in FIGS. 2 and 6, the shift control device 110 preferably includes, for example, a case member 126 mounted in the center of the handlebar 112, a shift controller 130 consisting of a microcomputer housed within the case member 126, and the aforementioned shifter portions 120$f$, 120$r$, 121$f$ and 121$r$. The shift control device 110 also has a liquid crystal display 135 housed within the case member 126. The shift controller 130 is connected to the front and rear upshift switches 131$f$ and 131$r$ and the front and rear downshift switches 132$f$ and 132$r$, which make up the shifter portions 120$f$, 120$r$, 121$f$ and 121$r$. The shift controller 130 is also connected to a speed sensor 122 mounted on the front fork 98, the front and rear derailleurs 97$f$ and 97$r$, and other input/output portions. The speed sensor 122 is configured and arranged to detect rotation of the front wheel 106$f$ by detecting a magnet 123 attached to a spoke 106$s$ of the front wheel 106$f$. The speed sensor 122 is then configured and arranged to output a rotation signal to the shift controller 130, either wirelessly or over a line.

The shift controller 130 is configured to control shifting of the front and rear derailleurs 97$f$ and 97$r$ in response to signals from the upshift switches 131$f$ and 131$r$ and downshift switches 132$f$ and 132$r$, and signals from front and rear shift position sensors 133$f$ and 133$r$. The output signals from the speed sensor 122 and the shift position sensors 133$f$ and 133$r$ are also used to produce display of speed and shift position on the liquid crystal display 135, as well as a display of distance traveled.

Figure 7:
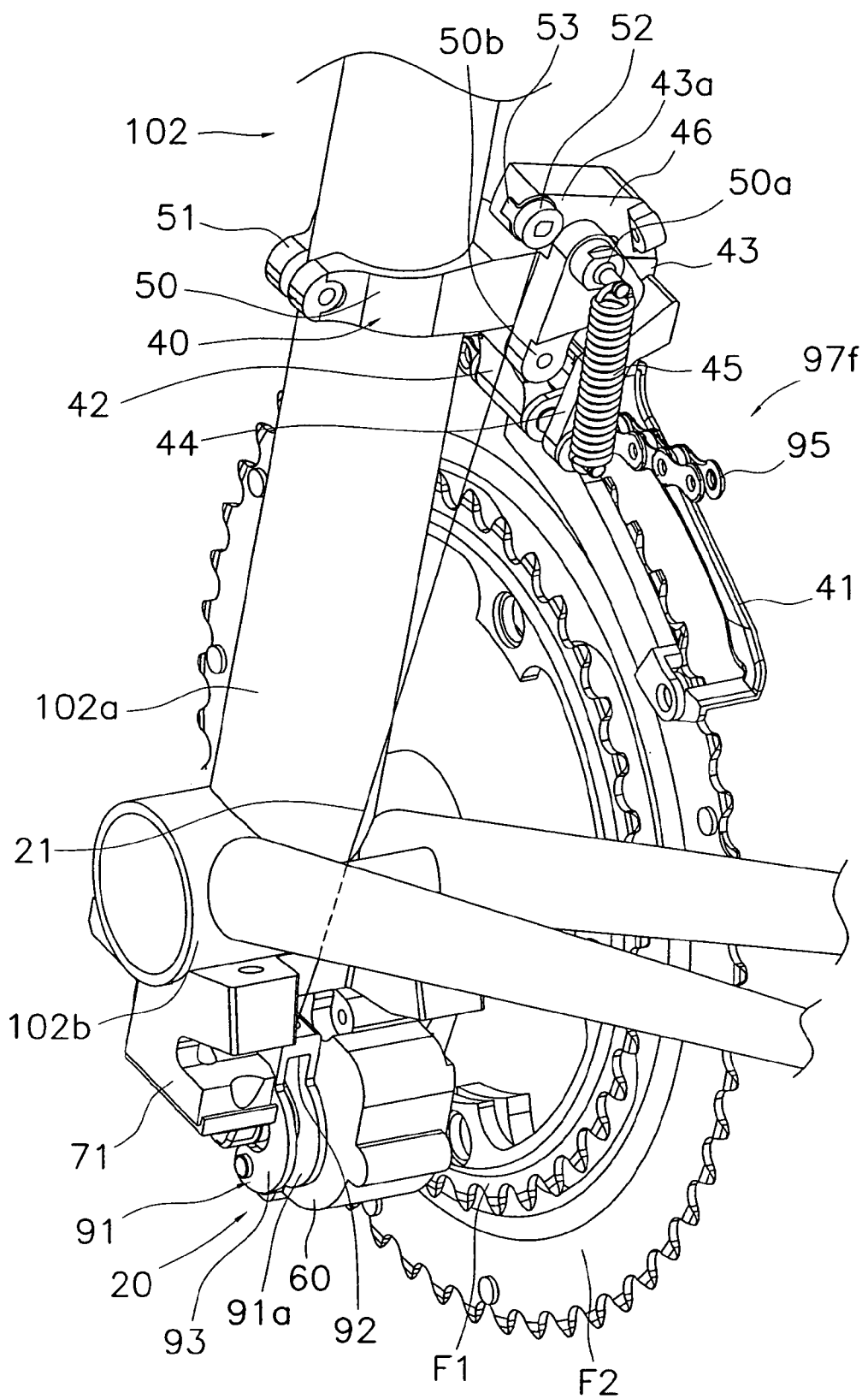
FIG. 7 is an enlarged perspective view of an area around a front derailleur of the bicycle illustrated in FIG. 1 in accordance with the first embodiment of the present invention.
Figure 8:
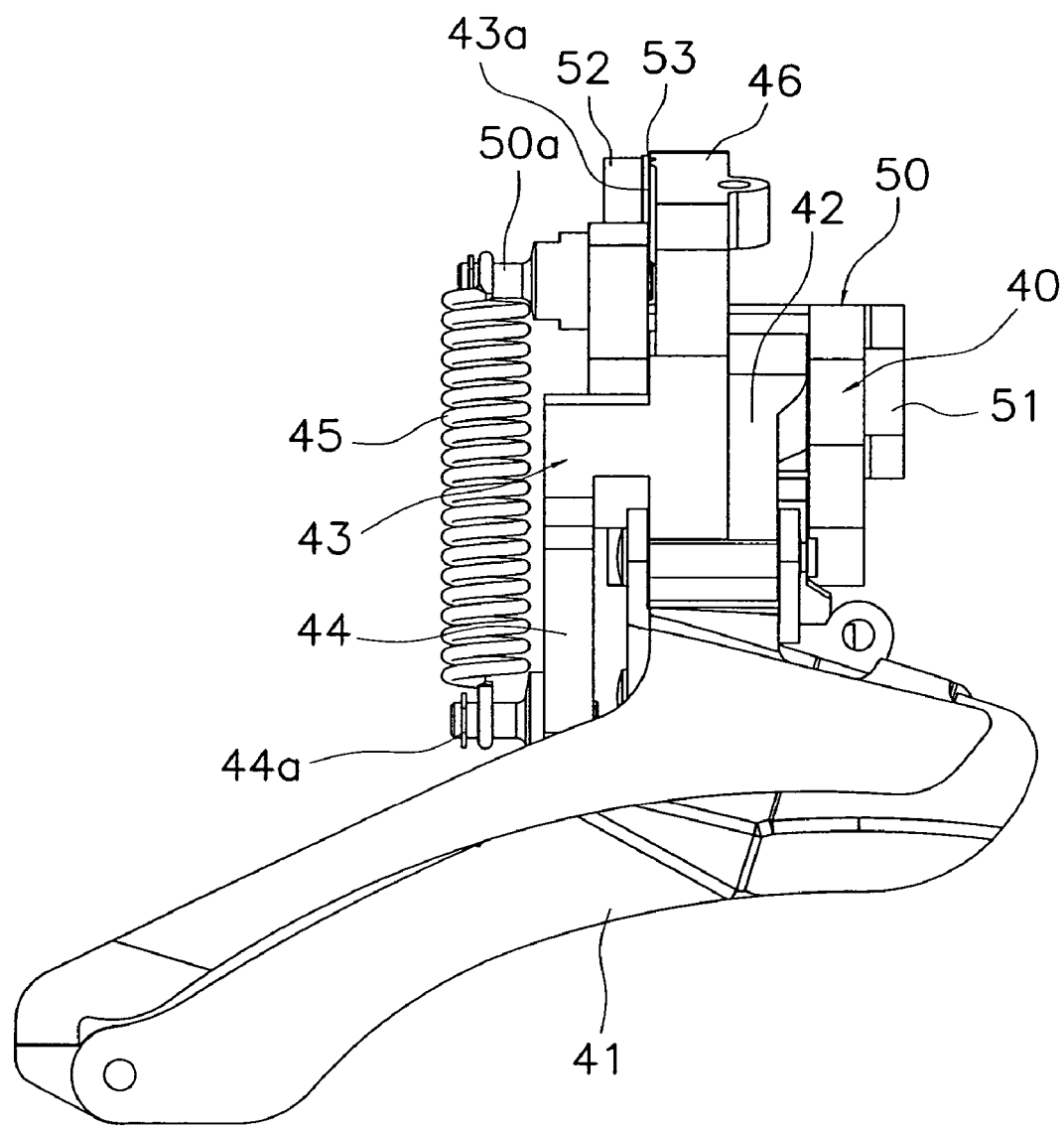
FIG. 8 is an enlarged side elevational view of the front derailleur illustrated in FIG. 7 in accordance with the first embodiment of the present invention.

As mentioned above, the drive portion 105 includes the chain 95, the front and rear derailleurs 97$f$ and 97$r$ for shifting the chain 95 between sprockets, and the front and rear sprocket sets 99$f$ and 99$r$. The front derailleur 97$f$ is a derailleur disposed on the seat tube 102$a$ of the frame 102, which guides the chain 95 between two shift positions. As shown in FIG. 7, the front derailleur 97$f$ is linked via a shift cable 21 (an example of the transmission member) to the front variable speed drive device 20 which preferably constitutes the variable speed drive device according to the first embodiment of the present invention. The front variable speed drive device 20 is mounted on the hanger portion 102b of the frame 102. In this embodiment, the shift cable 21 uses only an inner cable consisting of Bowden cable. The rear derailleur 97r is an electrically-controlled, powered derailleur having ten shift positions, disposed on the rear of the frame 102. The front and rear derailleurs 97f and 97r are configured and arranged to operate when they are supplied with power by a power supply (not shown) of the bicycle. As shown in FIG. 6, the front variable speed drive device 20 and the rear derailleur 97r are provided with the shift position sensors 133f and 133r for detecting the shift position.

Figure 5:
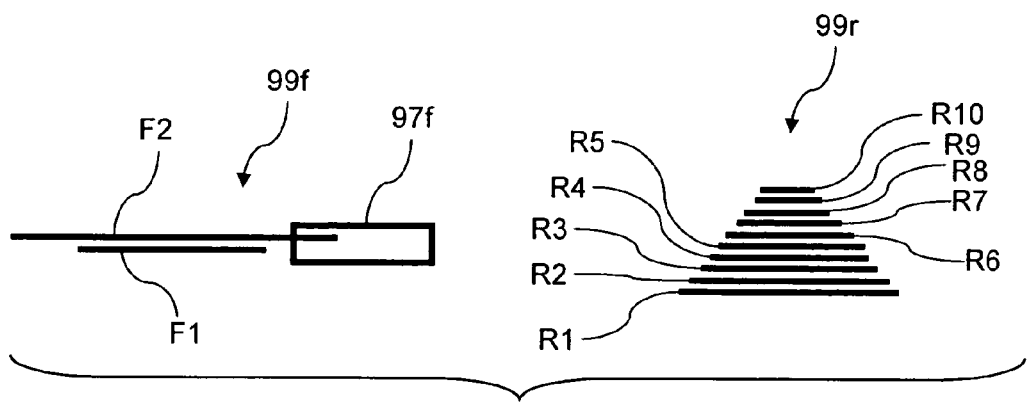
FIG. 5 is a simplified schematic diagram of front and rear sprocket sets in accordance with the first embodiment of the present invention.

As shown in FIG. 5, the front sprocket set 99f preferably has two sprockets F1 and F2 with different numbers of teeth, arranged in the axial direction of the crankshaft. The rear sprocket set 99r preferably has ten sprockets R1 to R10 with different numbers of teeth, arranged in the axial direction along the hub spindle of the rear wheel 106r. Here, the inner sprocket F1 has fewer teeth than the outer sprocket F2. Also, the number of teeth decreases in order from the innermost sprocket R1 to the outermost sprocket R10, with the outermost sprocket R10 having the fewest number of teeth. The front and rear derailleurs 97f and 97r perform shifting by moving the chain 95 among the plurality of sprockets F1 and F2 and R1 to R10. The shift operations are carried out by using the shifter portions 120f, 120r, 121f and 121r.

Figure 9:
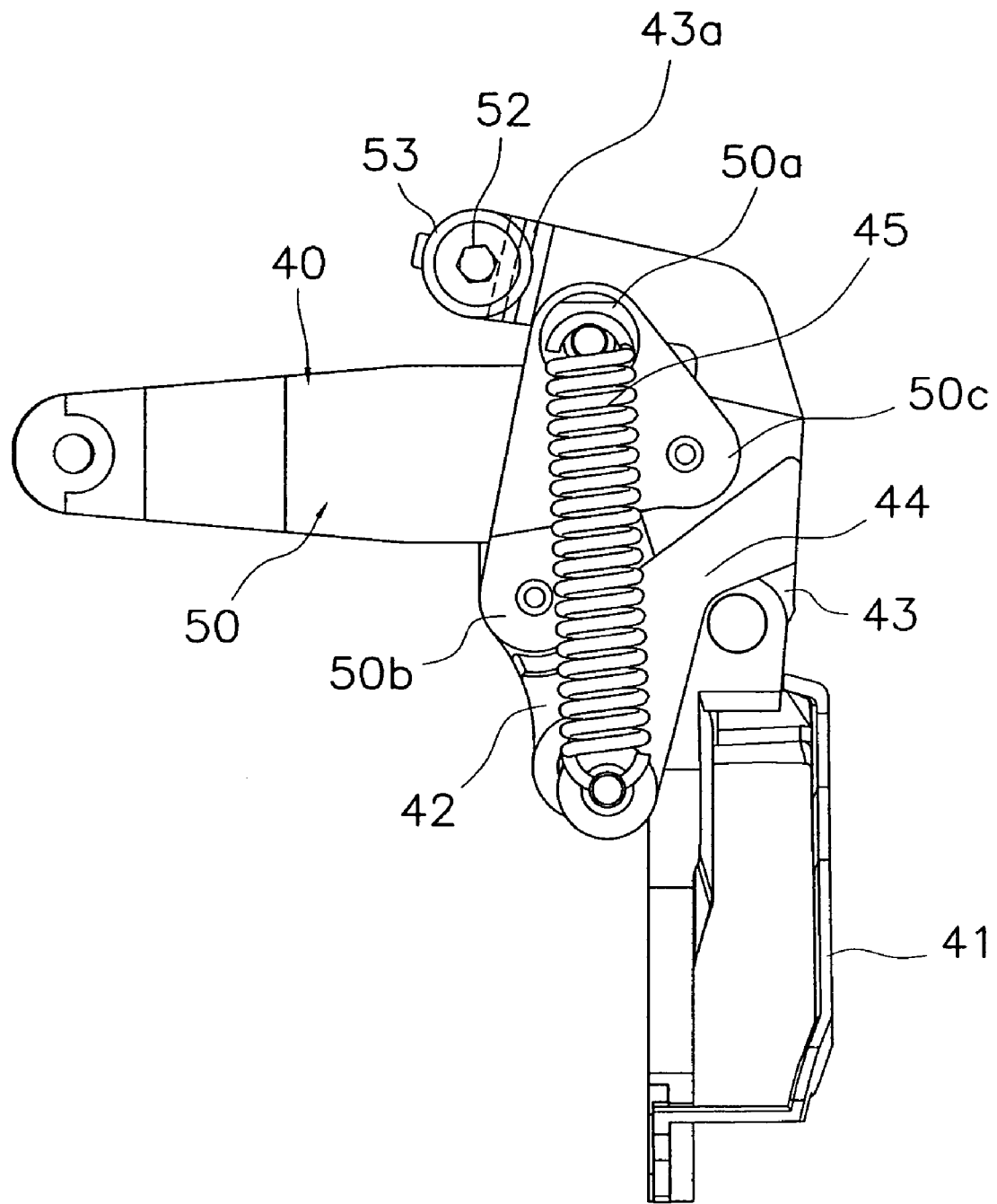
FIG. 9 is an enlarged rear elevational view of the front derailleur illustrated in FIGS. 7 and 8 showing when the front derailleur is positioned at high gear position in accordance with the first embodiment of the present invention.

As shown in FIGS. 7 to 10, the front derailleur 97f basically has a base bracket 40 mounted on the seat tube 102a, a chain guide 41 movable in the shifting direction toward and away from the base bracket 40, and a pair of inner link 42 and outer link 43 disposed parallel to one another for rotatably linking the base bracket 40 and the chain guide 41. The front derailleur 97f also has a first arm portion 44, a coil spring 45 and a second arm portion 46. The first arm portion 44 extends from the outer link 43 in a direction away from the base bracket 40 and towards the seat tube 102a. The coil spring 45 is linked at the two ends thereof with the base bracket 40 and the distal end of the first arm portion 44 for biasing the chain guide 41 into proximity with the seat tube 102a. The second arm portion 46 extends in a direction toward the seat tube 102a from the outer link 43 to retain the shift cable 21 at the distal end. In FIG. 9, the front derailleur 97f is shown as being positioned at the high gear position with the chain guide 41 disposed at the outside. On the other hand, in FIG. 10, the front derailleur 97f is shown as being positioned at the low gear position with the chain guide 41 disposed at the inside.

As shown in FIG. 7, the base bracket 40 of the front derailleur 97f has a first base member 50, and a second base member 51 mounted on the first base member 50 so that the second base member 51 freely opens and closes with respect to the first base member to surround the seat tube 120 in conjunction with the first base member 50. The first base member 50 includes a spring retaining portion 50a with projecting shaft shape on the upper portion of the first base member 50 for retaining the upper end of the coil spring 45. Moreover, the first base member 50 has a pair of inner link support portions 50b disposed below the spring retaining portion 50a for swingably mounting the inner link 42. Furthermore, a pair of outer link support portions 50c is disposed diagonally above the inner link support portions 50b for swingably mounting the outer link 43.

The chain guide 41 is swingably linked to the bottom ends of the inner link 42 and the outer link 43. The chain guide 41 is configured and arranged to guide the chain 95 to one of the two shift positions.

The inner link 42 is positioned below the base bracket 40 when the base bracket 40 installed on the seat tube 102a. The inner link 42 is rotatably linked with the base bracket 40 and the chain guide 41 at both ends thereof. More specifically, one end of the inner link 42 is swingably linked between the pair of inner link support portions 50b. The other end of the inner link 42 is swingably linked with the chain guide 41.

The outer link 43 is rotatably linked to chain guide 41 and the outer link support portion 50c of the base bracket 40 at both ends thereof at the location away from the base bracket 40. The outer link 43 is disposed parallel to the inner link 42. The middle portion of the outer link 43 is swingably linked to the outer link support portions 50c. The second arm portion 46 is integarally formed and extends from a coupling portion between the outer link 43 and the outer link support portions 50c while bending toward the seat tube 102a. A cable retaining portion 43a is disposed at the extending distal end of the second arm portion 46 for bolting the shift cable 21 in place. A fastener bolt 52 and an eared washer 53 are installed in the cable retaining portion 43a. The end of the shift cable 21 is installed between the eared washer 53 and the cable retaining portion 43a, and the fastening bolt 52 is tightened in to retain the end of the shift cable 21.

The first arm portion 44 extends from a portion between the link support portions of the outer link 43. The first arm portion 44 is provided in order to retain the coil spring 45 between the first arm portion 44 and the base bracket 40. Accordingly, a spring retaining portion 44a of projecting shaft shape is disposed on the distal end of the first arm portion 44 for retaining the lower end of the coil spring 45.

Figure 10:
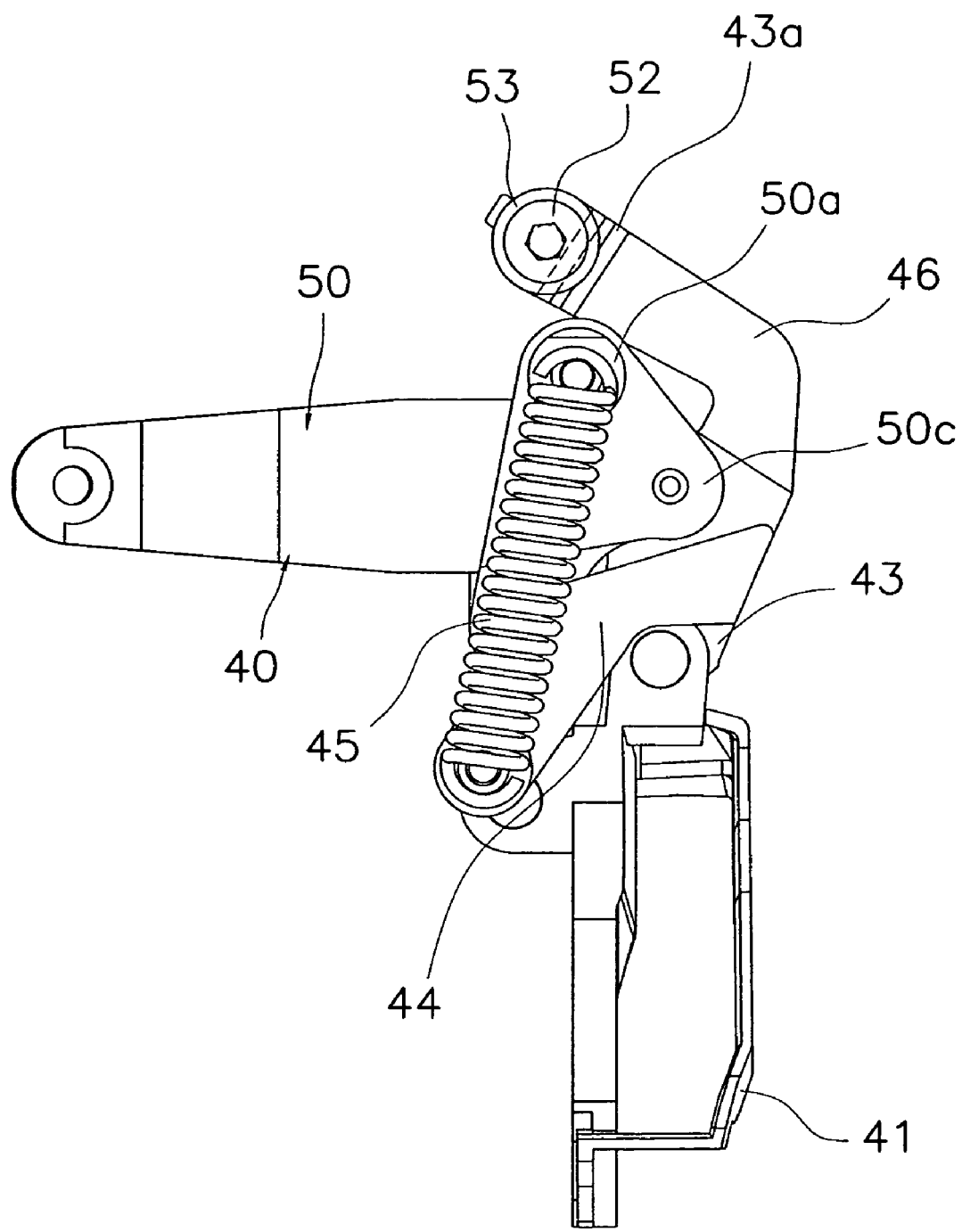
FIG. 10 is an enlarged rear elevational view of the front derailleur illustrated in FIGS. 7 to 9 showing when the front derailleur is positioned at low gear position.

The distal end of the first arm portion 44 is arranged such that, when the front derailleur 97f moves from the low gear position shown in FIG. 10 to the high gear position shown in FIG. 9, the first arm portion 44 does not interfere with the chain guide 41, and the coil spring 45 is in closest proximity to the center of rotation of the outer link support portions 50c, which is the center of rotation of the outer link 43. With this arrangement, by bringing the coil spring 45 into proximity with the center of rotation of the outer link 43, the level of extension of the coil spring 45 can be minimized, and less control force (force tensioning the shift cable) is required in proximity to the high gear location (the location at which the chain guide 41 is close to the sprocket F2) where the coil spring 45 is most extended and the biasing force thereof is strong. Accordingly, control force required when the shift cable 21 is tensioned with the shifter portions will be small. Moreover, when shift operations are carried out using the motor in the front variable speed drive device 20 of the first embodiment, the torque required from the motor for shifting can be reduced.

Figure 11:
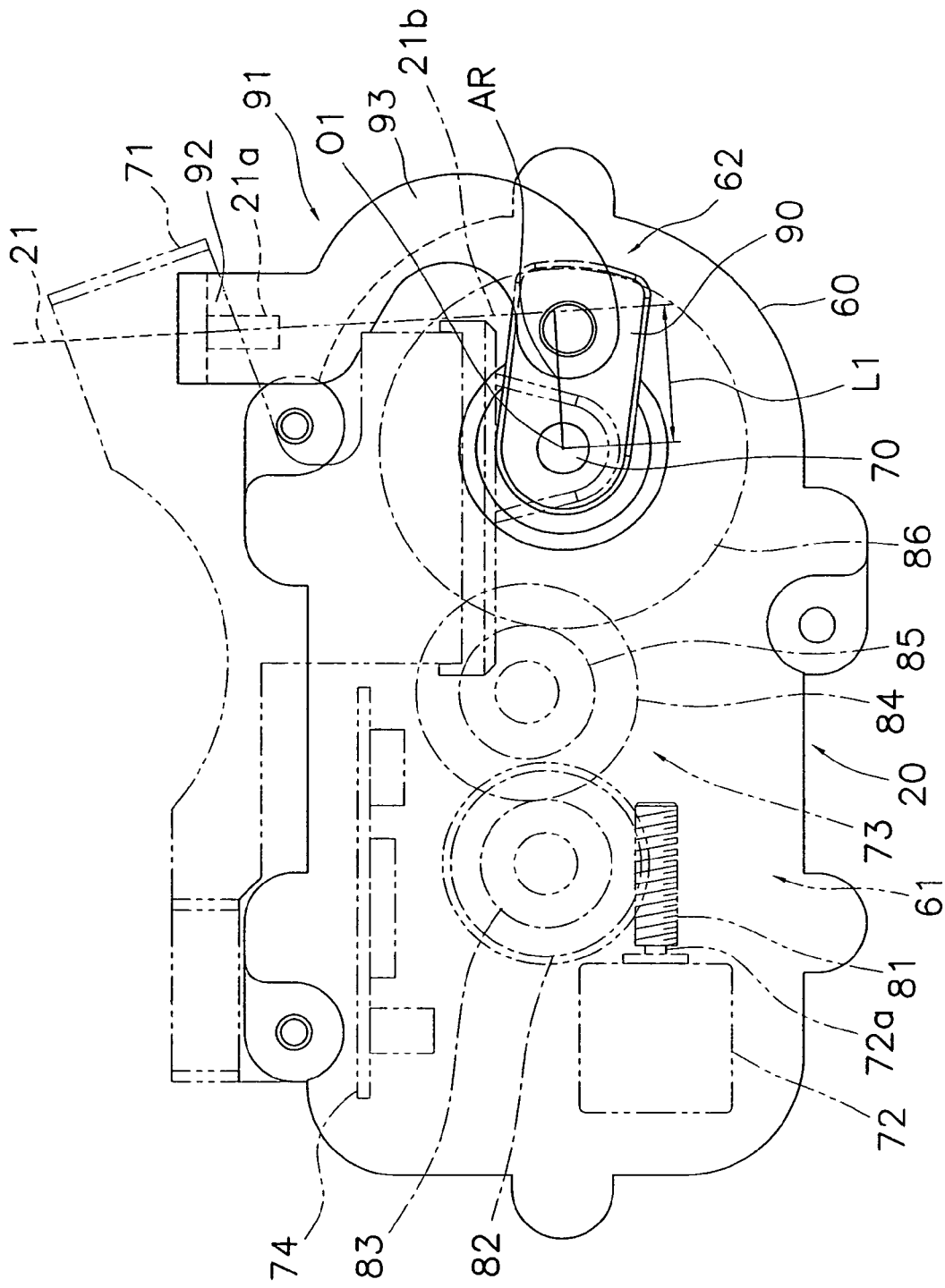
FIG. 11 is an enlarged side elevational view of a front variable speed drive section of the variable speed drive device showing when the front variable speed drive section is positioned at low gear position in accordance with the first embodiment of the present invention.
Figure 12:
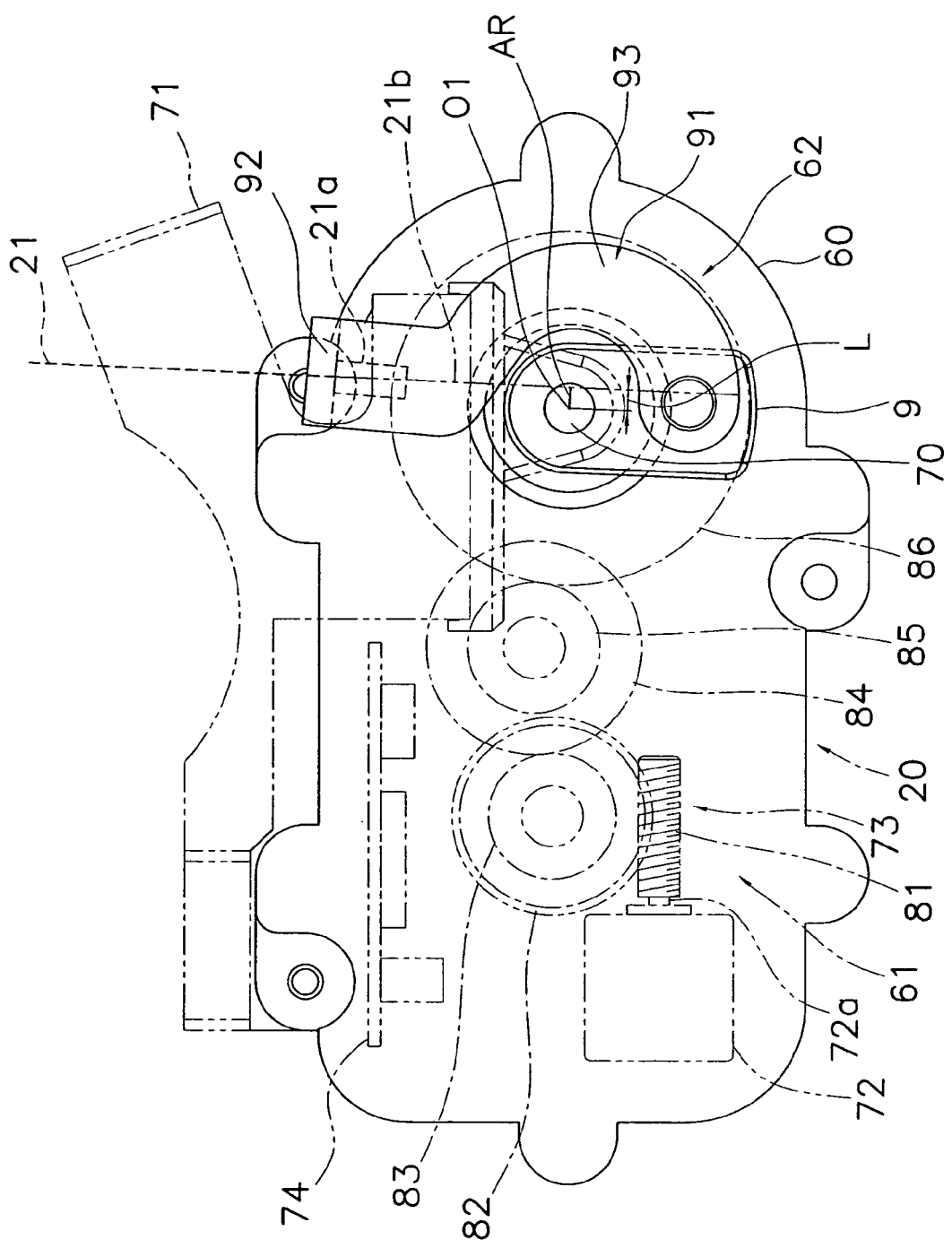
FIG. 12 is an enlarged side elevational view of the front variable speed drive section of the variable speed drive device illustrated in FIG. 11 showing when the front variable speed drive section is positioned at high gear position in accordance with the first embodiment of the present invention.

As shown in FIG. 7, 11 and 12, the front variable speed drive device 20 comprises, for example, a case member 60, a motor drive mechanism 61 and a linking structure or cable linking portion 62. The case member 60 is mounted on the hanger portion 102b of the frame 102 of the bicycle 101. The motor drive mechanism 61 has a revolving shaft 70, and mounted on the case member 60. The cable linking portion 62 is coupled to the shift cable 21. FIG. 11 shows the low gear position (with the chain guide 41 on the sprocket F1 side), and FIG. 12 shows the high gear position (with the chain guide 41 on the sprocket F2 side). The case member 60 has a space inside thereof for housing the motor drive mechanism 61, and is mounted onto a mounting bracket 71 affixed to the hanger portion 102b.

The motor drive mechanism 61 has a motor 72, a reduction gear mechanism 73 positioned between the motor 72 and the revolving shaft 70, and a motor drive circuit 74 for driving the motor 72 in response to a command from the shift controller 130.

The reduction gear mechanism 73 is configured and arranged to transmit rotation of the motor 72 to the revolving shaft 70 at reduced speed, and has a worm gear 81 rotatably installed on the output shaft 72a of the motor 72, a worm wheel 82 that meshes with the worm gear 81, and a first small-diameter gear 83 disposed concentrically with the worm wheel 82. The reduction gear mechanism 73 also has a first large-diameter gear 84 that meshes with the first small-diameter gear 83, a second small-diameter gear 85 disposed concentrically with the first large-diameter gear 84, and a second large-diameter gear 86 that meshes with the second small-diameter gear 85. The revolving shaft 70 is coupled to the second large-diameter gear 86 as seen in FIGS. 11 and 12. The front shift position sensor 133f is preferably disposed between the second large-diameter gear 86 and the inside surface of the case member 60 for detecting the shift position (detecting the rotation position of the second large-diameter gear 86) as mentioned above. In the first embodiment, since speed is reduced using the worm wheel 82 and the worm gear 81 having a lock function, the reduction gear mechanism 73 will not rotate even if force acts from the output end. Therefore, the cable linking portion 62 is reliably positioned at one of the low gear position or the high gear position.

The motor drive circuit 74 uses FETs or other conventional electronic components for PWM drive of the motor 72, for example. The motor drive circuit 74 drives the motor 72 in response to commands from the shift controller 130. The cable linking portion 62 is non-rotatably mounted on the revolving shaft 70, and the length L of a hypothetical arm line AR extending in the direction perpendicular to the shift cable 21 from the center of rotation O1 changes depending on the rotation phase. In FIG. 11 and FIG. 12, the hypothetical arm line AR is shown extending in the direction perpendicular to an extension line of the shift cable 21 from the center of rotation O1. The cable linking portion 62 has a first arm member 90 with a base end being non-rotatably mounted on the revolving shaft 70, and a second arm member 91 that is rotatably linked to the distal end of the first arm member 90. The second arm member 91 has at the distal end thereof a cable retaining portion 92 for retaining a cylindrical portion 21a formed on one end of the shift cable 21.

The first arm member 90 is a plate shape member extending generally diametrically outward from the center of rotation O1. The base end of the first arm member 90 is supported at both side surfaces by the mounting bracket 71 and the case member 60.

The second arm member 91 has the cable retaining portion 92 mentioned above, and a curved portion 93 that curves in arcuate shape from the cable retaining portion 92. A free end of the curved portion 93 is coupled to the first arm member 90. The second arm member 91 is linked with the first arm member 90 so as to sandwich the two surfaces at the distal end of the first arm member 90. By providing the second arm member 91 with a curved portion 93 as described above, when the front derailleur 97f is moved to the high gear position as shown in FIG. 12, the length of the hypothetical arm line AR shortens without the shift cable 21 interfering with the revolving shaft 70. Thus, for a given level of torque generated by the motor 72, stronger force acts on the shift cable 21 so that shifting to the high gear position, which requires strong force, can take place with a lower torque of the motor 72. Also, when the front derailleur 97f is moved to the low gear position as shown in FIG. 11, the length L of the hypothetical arm line AR is longer than at the high gear position as shown in FIG. 12, so the force acting on the shift cable 21 becomes weaker.

With the front variable speed drive device 20 having such an arrangement, when one of the front shifter portions 120f and 121f is operated with the front derailleur 97f in the low gear position to turn on the front upshift switch 131f, the motor 72 turns in a first direction moving the cable linking portion 62 from the low gear position shown in FIG. 11 to the high gear position shown in FIG. 12. As a result, the shift cable 21 is tensioned, and the front derailleur 97f moves from the low gear position shown in FIG. 10 to the high gear position shown in FIG. 9. At this time, the length L of the hypothetical arm line AR gradually becomes shorter depending on the rotation phase of the cable linking portion 62, with the length L of the hypothetical arm line AR reaching its minimum length at the high gear position. As a result, when the cable linking portion 62 rotates from the low gear position to the high gear position, the force exerted on the shift cable 21 increases gradually.

On the other hand, when one of the front shifter portions 120f and 121f is operated with the front derailleur 97f in the high gear position to turn on the front downshift switch 132f, the motor turns in the other direction moving the cable linking portion 62 from the high gear position shown in FIG. 12 to the low gear position shown in FIG. 11. As a result, force ceases to act on the shift cable 21, and under the urging force of the coil spring 45 the front derailleur 97f moves from the high gear position shown in FIG. 9 to the low gear position shown in FIG. 10.

In this first embodiment of the present invention, since the cable linking portion 62 is mounted on the revolving shaft 70 in such a way that the length L of the hypothetical arm line AR extending in the direction perpendicular to the shift cable 21 from the center of rotation O1 changes, the level of torque required from the motor 72 in order to perform the gearshift operation can be reduced, with a simple structure.

In the front derailleur 97f as well, the distal end of the first arm portion 44 is positioned such that when the front derailleur 97f moves from the low gear position shown in FIG. 10 to the high gear position shown in FIG. 9, the first arm portion 44 does not interfere with the chain guide 41, and the coil spring 45 is in closest proximity to the center of rotation of the outer link support portions 50c, which is the center of rotation of the outer link 43. In this way, by bringing the coil spring 45 into proximity with the center of rotation of the outer link 43, the level of extension of the coil spring 45 can be minimized, and less control force (force tensioning the shift cable) will be required in proximity to the high gear location (the location at which the chain guide 41 is close to the sprocket F2) where the coil spring 45 is most extended and the biasing force thereof is strong.

Accordingly, with the front variable speed drive device 20 of the present invention, when the revolving shaft 70 rotated by the motor 72 of the motor drive mechanism 61 turns, the cable linking portion 62 swings. Then, the shift cable 21 linked to the cable retaining portion 92 undergoes displacement, and the front derailleur 97f is electrically driven. At this time, since the length of the hypothetical arm line AR which extends in the direction perpendicular to the shift cable 21 from the center of rotation O1 changes depending on the rotation phase of the cable linking portion 62, the rotation phase of the cable linking portion 62 is established in such a way that length L of the hypothetical arm line AR is shorter during rotation transfer requiring the most energy by the front derailleur 97f, whereby stronger force acts on the derailleur 97f despite an unchanged level of torque. In the case of an external variable speed gearshift device such as the front derailleur 97f, for example, by establishing the rotation phase of the member linking portion in such a way that length L of the hypothetical arm line AR is shorter when shifting to the largest sprocket F2, it is possible to operate the front derailleur 97f at a high power level despite the unchanged level of torque. Thus, motor torque required from the motor 72 can be lower. In the present invention, since the cable linking portion 62 is mounted on the revolving shaft 70 in such a way that the length L of hypothetical arm line AR extending in the direction perpendicular to the shift cable 21 from the center of rotation O1, the motor torque of the motor 72 needed for shifting the gear can be reduced with a simple structure.

Also, in the front variable speed drive device 20 of the first embodiment, the cable linking portion 62 has a first arm member 90 with a base end being non-rotatably mounted on the motor drive mechanism 61, and a second arm member 91 rotatably linked to a second end of the first arm member 90 and provided with the cable retaining portion 92. The second arm member 91 is rotatably linked to the first arm member 90, whereby the length L of the hypothetical arm line AR perpendicular to the shift cable 21 can vary with a simple structure.

Moreover, the front variable speed drive device 20 of the present invention, the second arm member 91 has the cable retaining portion 92, and the curved portion 93 that curves in an arcuate shape from the cable retaining portion 92. The free end of the curved portion 93 is connected to the first arm member 90. Therefore, interference between the revolving shaft 70 and the cable linking portion 62 can be avoided by the curved portion 93 which curves in an arcuate shape from the cable retaining portion 92, so that the length L of the hypothetical arm line AR can be made even shorter and the level of motor torque required from the motor 72 can be even lower.

Furthermore, with the front variable speed drive device 20 of the preset invention, the shift cable 21 is used, and the cable retaining portion 92 is configured and arranged to retain a first end of the shift cable 21. Therefore, since a flexible shift cable 21 is used, the retaining structure of the cable retaining portion 92 can be made simple.

According to the present invention, the cable linking portion 62 is installed on the revolving shaft 70 in such a way that the length L of the hypothetical arm line AR which extends in the direction perpendicular to the cable linking portion 62 from the center of rotation O1 changes, whereby the level of torque required of the motor in order to perform gear shifting can be reduced with a simple structure.

Second Embodiment

Figure 13:
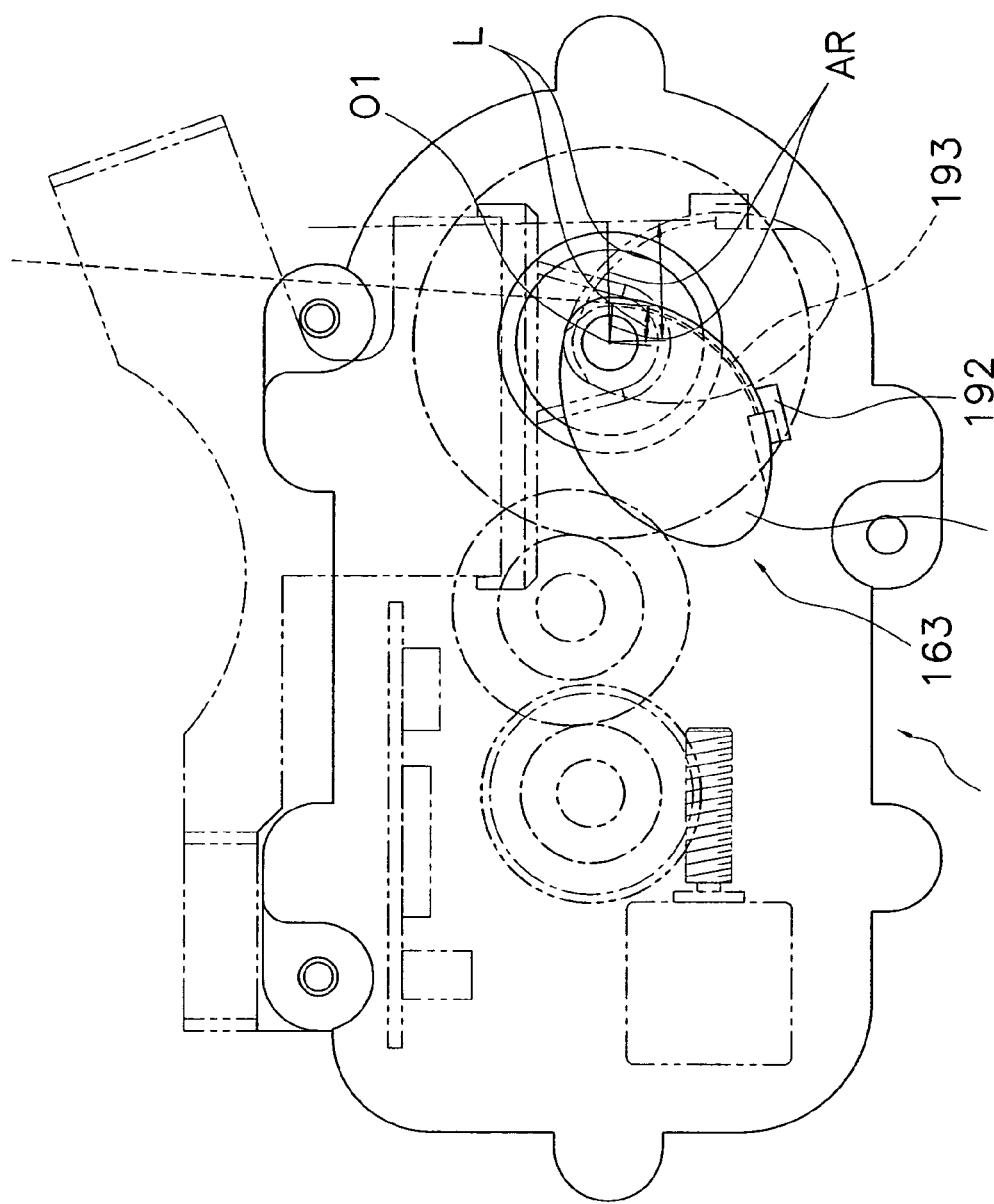
FIG. 13 is an enlarged side elevational view of a modified structure of a front variable speed section of a variable speed drive device in accordance with a second embodiment of the present invention.

Referring now to FIG. 13, a variable speed drive device 120 in accordance with a second embodiment will now be explained. In view of the similarity between the first and second embodiments, the parts of the second embodiment that are identical to the parts of the first embodiment will be given the same reference numerals as the parts of the first embodiment.

The second embodiment of the present invention is basically identical to the first embodiment except for the structure of a cable linking portion 163. More specifically, in the first embodiment described above, the length L of the hypothetical arm line AR is made variable by providing the first and second arm members 90 and 91 in the cable linking portion 62. However, in the second embodiment as shown in FIG. 13, the cable linking portion 163 comprises a cam member 191 having a retaining portion 192 for retaining the shift cable 21, and a cable guide groove 193 for guiding the shift cable 21 toward the retaining portion 192. The cam member 191 of the front variable speed drive device 120 is shaped so that the distance from the center of rotation O1 to a prescribed point in the guide groove 193 changes depending on the rotation phase of the cam member 191. The retaining portion 192 is formed at the terminal end of the guide groove 193. In this embodiment as well, the length L of the hypothetical arm line AR changes between the high gear position shown by solid lines in FIG. 13 and the low gear position indicated by double-dot broken lines, so that the high gear position is shorter than the low gear position. Working effects analogous to those in the first embodiment are obtained in the second embodiment of the present invention. Other arrangements and operation are analogous to those in the first embodiment and need not be described again.

Accordingly, the front variable speed drive device 120 of the second embodiment has the cable linking portion 163 with the retaining portion 192. The cable linking portion 163 includes a cam member 191 non-rotatably mounted on the revolving shaft 70 and a guide slot 193 formed on the outside peripheral surface of the cam member 191 for guiding the shift cable 21 retained by the retaining portion 192. The cam member 191 is configured and arranged such that the distance from the center of rotation O1 to the guiding slot 193 changes depending on the rotation phase of the cam member 191. Therefore, since the cable linking portion 163 comprises the cam member 191, and the distance from the center of the rotation O1 to the guiding slot 193 changes depending on the rotational phase when the flexible shift cable 21 is guided by the guiding slot 193, the arrangement of the cable linking portion 163 can be made simple.

Although in the above explained embodiments, the front variable speed drive device 20 or 120 for driving the front derailleur 97f is used as an example of the variable speed drive device of the present invention, the variable speed drive device of the present invention can also be configured and arranged to drive the rear derailleurs 97r or to drive an internal variable speed gearshift device.

Moreover, although in the above explained embodiments, force is exerted on the cable linking portion 62 or 163 by the worm gear 81 and the worm wheel 82 to position and lock the motor 72 in order to prevent the cable linking portion 62 or 163 from turning, as well as reducing speed, the reduction and locking/positioning functions could be separated, using a locking pawl or the like to position and lock the cable linking portion 62 or 163, for example.

Furthermore, although in the above explained embodiments, the shift cable 21 is used as the example of the transmission member, a ring, rod, or other member can be also used as the transmission member of the present invention.

As used herein to describe the present invention, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. These terms of degree should be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A variable speed drive device adapted to be coupled to a variable speed gearshift device of a bicycle via a transmission member to electrically drive the variable speed gearshift device, the variable speed drive device comprising:
    a case member configured and arranged to be mounted to a frame of the bicycle;
    a motor drive mechanism mounted on the case member, the motor drive mechanism having a revolving shaft with a first pivot axis that is stationary with respect to the case member; and
    a linking structure having a retaining portion configured and arranged to retain the transmission member, the linking structure being mounted on the revolving shaft of the motor drive mechanism, and configured and arranged such that a length of a hypothetical arm line measured extending from a center of rotation of the revolving shaft perpendicularly to a longitudinal axis of the transmission member changes depending on a rotational phase of the revolving shaft when the transmission member is attached to the retaining portion, the linking structure further including
        a first arm member with a first end non-rotatably mounted on the revolving shaft of the motor drive mechanism such that the first arm member rotates around the first pivot axis when the revolving shaft rotates about the first pivot axis, and
        a second arm member with a first end rotatably coupled to a second end of the first arm member around a second pivot axis that shifts with respect to the case member with the retaining portion being provided on a second end of the second arm member, the first and second pivot axes having a constant distance therebetween as the revolving shaft rotates about the first pivot axis.

2. The variable speed drive device according to claim 1, wherein
    the second arm member of the linking structure further includes a curved portion that curves in an arcuate shape from the retaining portion to the first end of the second arm member.

3. The variable speed drive device according to claim 2, wherein
    the curved portion of the second arm member is configured and arranged such that an interference between the second arm member and the revolving shaft is avoided when the length of the hypothetical arm line is a minimum value.

4. The variable speed drive device according to claim 1, wherein
    the retaining portion of the linking structure is configured and arranged to retain a first end of the transmission member that is arranged as a shift cable.

5. The variable speed drive device according to claim 1, wherein
    the motor drive mechanism further includes a motor and a reduction gear mechanism that is disposed between the motor and the revolving shaft.

6. The variable speed drive device according to claim 5, wherein
    the reduction gear mechanism of the motor drive mechanism has a lock function that is configured and arranged to prevent a reverse rotation of the revolving shaft when a force is inputted from an output side of the revolving shaft.

7. A variable speed drive device comprising:
    a variable speed gearshift device configured and arranged to be mounted to a bicycle; and
    a variable speed drive device operatively coupled to the variable speed gearshift device by a transmission member to operate the variable speed gearshift device of the bicycle, the variable speed drive device further including
        a case member configured and arranged to be mounted to the bicycle frame
        a motor drive mechanism mounted on the case member, the motor drive mechanism having a revolving shaft with a first pivot axis that is stationary with respect to the case member; and
        a linking structure having a retaining portion attached to the transmission member, the linking structure being mounted on the revolving shaft of the motor drive mechanism, and the linking structure being arranged such that a length of a hypothetical arm line measured extending from a center of rotation of the revolving shaft perpendicularly to a longitudinal axis of the transmission member changes depending on a rotational phase of the revolving shaft,
    the linking structure further including
    a first arm member with a first end non-rotatably mounted on the revolving shaft of the motor drive mechanism such that the first arm member rotates around the first pivot axis of the revolving shaft that is when the revolving shaft rotates about the first pivot axis, and
    a second arm member with a first end rotatably coupled to a second end of the first arm member around a second pivot axis that shifts with respect to the case member with the retaining portion being provided on a second end of the second arm member, the first and second pivot axes having a constant distance therebetween as the revolving shaft rotates about the first pivot axis.

* * * * *